E. FEHR.
ROTARY CLUTCH.
APPLICATION FILED DEC. 27, 1920.

1,403,678.

Patented Jan. 17, 1922.
2 SHEETS—SHEET 1.

Inventor.
Edmund Fehr,
by Bakewell, Byrnes, Parmelee,
his Attys.

E. FEHR.
ROTARY CLUTCH.
APPLICATION FILED DEC. 27, 1920.
1,403,678.
Patented Jan. 17, 1922.
2 SHEETS—SHEET 2.
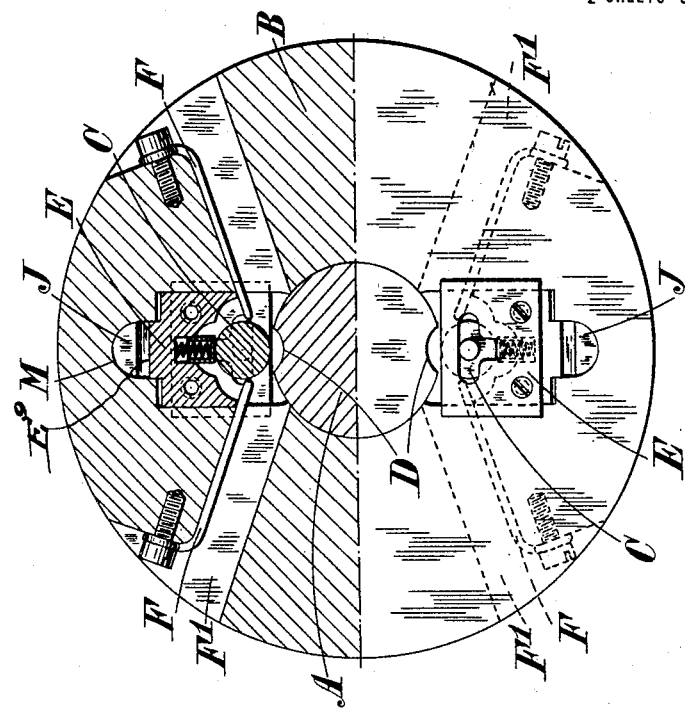
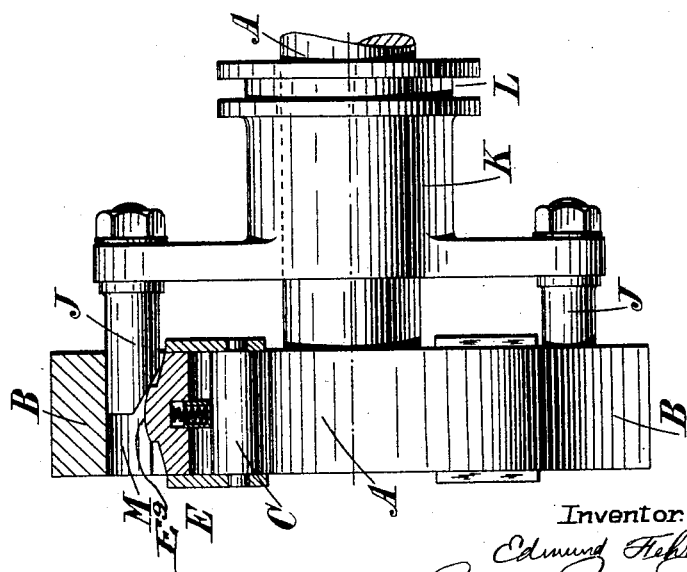
Inventor.
Edmund Fehr,
by Bakewell, Byrnes Parmelee,
his Attys.

UNITED STATES PATENT OFFICE.

EDMUND FEHR, OF HARLESDEN, LONDON, ENGLAND.

ROTARY CLUTCH.

1,403,678.   Specification of Letters Patent.   Patented Jan. 17, 1922.

Application filed December 27, 1920.   Serial No. 433,112.

*To all whom it may concern:*

Be it known that I, EDMUND FEHR, a citizen of the Swiss Confederation, residing at Harlesden, in London, England, have invented certain new and useful Improvements in Rotary Clutches, of which the following is a specification.

This invention is for improvements in or relating to rotary clutches of the type wherein a driving and a driven element are provided, the one with recesses and the other with a clutch block and a radially-movable carrier therefor, spring-pressed in the declutching direction, and with means whereby the said clutch block can be engaged in one of the recesses at will. This invention has for its object to provide a construction of clutch of the above type in which the two said elements can be more effectively clutched together than in clutches of this type hitherto used.

According to this invention there is provided a rotary clutch wherein each clutch-block is pressed in the clutching direction by a spring interposed between it and its carrier, and the connection between it and its said carrier comprises a guideway on the one and a co-operating piece on the other to enter the said guideway, which guideway is substantially T-shaped with the stem radial to the rotational axis of the clutch.

Preferably the carrier-controlling springs are plate springs so disposed that during the movement of the carrier in the declutching direction, the clutch-block is moved by the said springs to a position in which it is again permitted radial movement relatively to its said carrier.

Two methods of carrying out the present invention will now be described with reference to the accompanying drawings in which—

Figure 4 shows a side elevation in part section of a modified clutch, and

Figure 5 is a front view in part section of the clutch shown in Figure 4.

A hollow driving shaft A has its end enlarged and received concentrically within a driven-member B which may be a gear wheel. The said driving shaft is provided with clutch blocks in the form of rollers C arranged to engage in recesses D formed in the inner periphery of the driven member. These rollers are held in carriers E slidingly mounted in radially disposed slots $A^1$ formed in the aforesaid enlarged portion of the driving shaft and plate-springs F bear on the carriers to press them towards the centre of the shaft. Each carrier is provided with a stem $E^{10}$ which extends into an open ended cavity $A^2$ formed radially in the driving shaft and is provided with a ball G constituting an anti-friction member seated in the open bottom of the said cavity so as to extend into the bore $A^3$ of the shaft to be engaged by a wedge-ended operating rod H therein.

Each of the carriers is constituted by a centre-piece $E^1$ sliding in the slot $A^1$ and two side plates $E^2$ overlapping the edges of the slot and secured to the said centre-piece. The side plates are each provided with a guideway in the form of a T-shaped slot, the stem $E^3$ of the T being nearest the centre of the shaft and radially disposed, and the roller C is provided at its ends with axis pins $C^1$ which extend into the said slots and form the means of attachment for the roller to the carrier. The roller is kept pressed towards the head of the slot by a spring $C^2$ in compression interposed between the said roller and the centre-piece of its carrier, which spring has a plunger-like cap $C^3$ guided in a housing provided in the said centre-piece.

Figure 1:
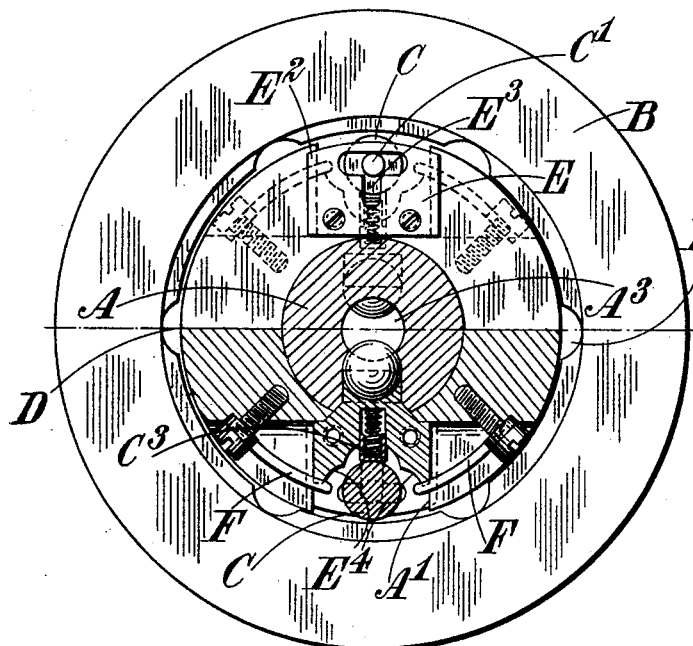
Figure 1 is an end view, partly in section, of a rotary clutch according to this invention with the parts in the declutched position.
Figure 2:
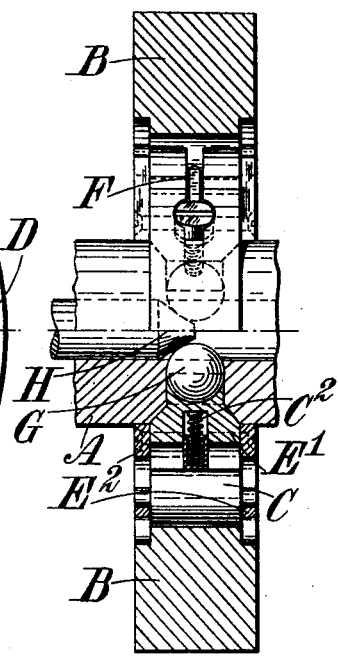
Figure 2 is a transverse section through the clutch shown in Figure 1 shown partly solid.
Figure 3:
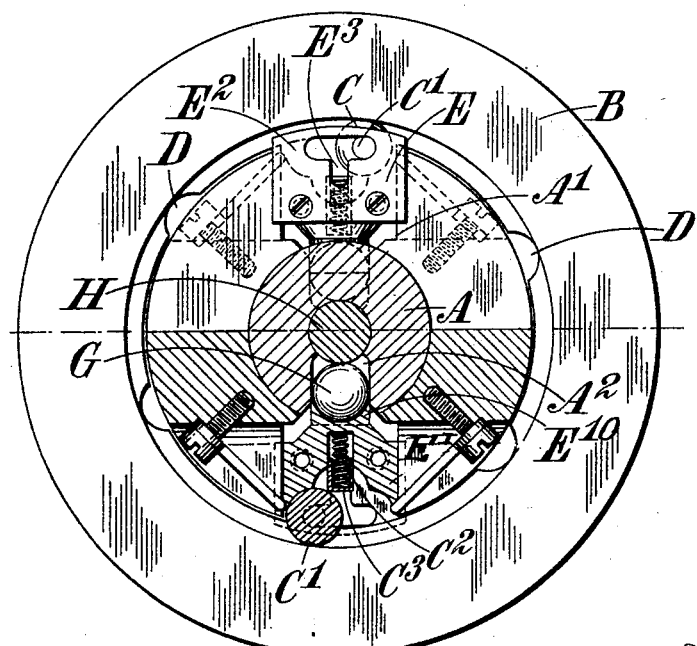
Figure 3 is a view similar to Figure 1 but with the parts in clutched engagement.

In the declutched position of the parts (Fig. 1) the rollers are held from contact with any part of the driven-member and are located with their pivot pins removed from the ends of the slots in which they work by the free ends of the springs F. If desired, the parts may be so proportioned that these springs constitute a centering device for the rollers C, in which case these rollers will be located in line with the radial parts E³ of the slots. When it is desired to "throw in" the clutch the rod H is moved so that its end enters between the balls G of the carriers and forces them radially apart against the action of the springs F. The rollers C are thus brought into contact with the inner periphery of the driven member B. The continued movement of the rod H advances the carriers further so that the springs C² are further compressed, the axis pins of the rollers moving in the stems E³ of the slots. Immediately the relative movement of the driving-shaft and driven-member causes one of the recesses D to lie opposite a roller, this latter is advanced by its spring C² into the said recess, the axis pins of the roller being moved clear of the portions E³ of their slots and into the heads of the same. The further relative movement of the driving-shaft and driven-member causes the rollers to be carried in more or less tangential direction so that the axis pins C¹ move into a branch of the head-portion of the slots until the rollers are arrested by seatings E⁴ formed in the centre-pieces of their carriers. The rollers are now held against radial movement relatively to their carriers by engagement in their slots, and the carriers themselves are held against radial movement in either direction, the parts being in the position shown in Figure 3.

It will be appreciated therefore that a strong clutching action is obtained since the parts cannot become declutched unless the rod H is withdrawn from between the balls G. The springs C² insure the smooth engagement of the rollers in their recesses, and permit the rod H to be fully operated instantly, regardless of the relative positions of the driving-shaft and driven-member.

Obviously the above device may be modified so that the parts are inversely situated. Such a construction is illustrated in Figures 4 and 5, the driving-shaft A in this case is solid and has a solid enlarged end situated as before but the recesses D are formed in the periphery of the said end instead of in the driven-member B, and the latter is formed with two radial slots in which inversely disposed carriers E and clutch blocks C are received, the carrier springs F being housed in channels F¹ formed in one face of the said driven-member. The means for operating the carriers in this construction conveniently consists of two wedge-ended pins J, one for each carrier, secured to a yoke K which is formed with a grooved boss L to receive an ordinary pivoted operating lever and is loosely received on the driving-shaft. The pins J are disposed parallel with the axis of the driving-shaft and are guided in cavities M formed in the driving-member into which a short stem E⁹ of each carrier extends.

The operation of this clutch is substantially the same as that previously described and a similarly strong clutching effect is obtained.

It will be appreciated that the details of both constructions may be varied without departing from the spirit of the invention and that the scope of the invention is not limited to the said constructions.

What I claim as my invention and desire to secure by Letters Patent is:—

1. In a rotary clutch, the combination of a driving-element and a driven element the one provided with recesses and the other with a radially-movable carrier, a clutch-block carried by said carrier and arranged to enter said recesses, a spring tending to move the carrier in the declutching direction, said carrier and said block having the one a substantially T-shaped guideway and the other a cooperating part arranged to be guided therein, the stem of the T-shaped guideway being directed radially to the axis of rotation of the clutch, and a second spring that is interposed between said block and its carrier and tends to move the block into its clutching position.

2. In a rotary clutch the combination of a driving element and a driven element, the one provided with recesses and the other with a radially movable carrier, a clutch block carried by said carrier and arranged to enter said recesses, two plate springs tending to move the carrier in the declutching direction, said plate springs being arranged with their free ends overhanging the carrier so as to coact with the block during the declutching movement of the carrier and to constitute a centering device for the block, said carrier and said block having the one a substantially T-shaped guideway and the other a cooperating part arranged to be guided therein, the stem of the T-shaped guideway being directed radially to the axis of rotation of the clutch, and a second spring that is interposed between said block and its carrier and tends to move the block into its clutching position.

3. In a rotary clutch the combination of a driving element and a driven element, the one provided with recesses and the other with a radially movable carrier, a clutch block carried by said carrier and arranged to enter said recesses, a spring tending to move the carrier in the declutching direction, said carrier being provided with a substantially T-shaped guideway and said block with a cooperating part to be guided in said guideway, the stem of the T-shaped guideway being directed radially to the axis of rotation of the clutch, said carrier having two abutments one at each end of the head of the T-shaped guideway for arresting the movement of the block at the ends of the head of said guideway, and a second spring that is interposed between the said block and its carrier and tends to move the block into its clutching position.

4. In a rotary clutch the combination of a driving element and a driven element, the former being provided with a radially movable carrier and the latter with recesses, a clutch block in the form of a roller carried by said carrier and arranged to enter said recesses, two plate springs tending to move the carrier in the declutching direction, said plate springs being arranged with their free ends overhanging the carrier so as to coact with the roller during the declutching movement of the carrier and to constitute a centering device for the roller, said carrier being provided with a substantially T-shaped guideway and said roller with cooperating axis pins to be guided in said guideway, the stem of the T-shaped guideway being directed radially to the axis of rotation of the clutch, said carrier having two abutments one at each end of the head of the T-shaped guideway for arresting the movement of the roller in the ends of the head of said guideway, and a coiled spring in compression that is interposed between said roller and its carrier, and tends to move the roller into its clutching position.

In testimony whereof I affix my signature.

EDMUND FEHR.